United States Patent Office 3,081,263
Patented Mar. 12, 1963

3,081,263
PRECIPITATION OF PARTICULATE OR MOLECULAR MATERIALS IN ELECTROSTATIC DEVELOPING
Kenneth Archibald Metcalfe, Graymore, South Australia, and Robert John Wright, South Payneham, South Australia, Australia, assignors to the Commonwealth of Australia, % the Secretary of the Department of Supply, Melbourne, Victoria, Australia
Filed Nov. 29, 1957, Ser. No. 699,646
Claims priority, application Australia Dec. 21, 1956
2 Claims. (Cl. 252—62.1)

This invention relates to method and means for precipitating particulate or molecular materials such as paint, paint pigments, ink, lacquer, wax, resins, emulsions of various types, oils, dyes, gums, solutions and the like. The materials to be precipitated include any materials dispersed in non-polar liquids or liquids of substantially non-polar character or liquids or relatively high volume resistivity including the alcohols, hydrocarbons, chlorinated hydrocarbons, fluorinated hydrocarbons, cylic hydrocarbons, ketones and the like.

Further, this invention relates to precipitation of materials of physical means which is effected in a bath or container of electrically insulating liquid or dispersion of particles, colloids, emulsions, solutions, large molecules, emulsoids or gas in such a liquid as opposed to the chemical deposition or electrostatic deposition by applied electrical fields used in prior methods of precipitating materials from a bath.

Previously, particulate materials have been partly or completely, according to the degree of fineness, removed or precipitated from such suspensions, colloids and the like by the application of substantial contrifugal forces in centrifuges and ultra-centrifuges, but it is well known that with very fine suspensions particularly those peptised by resinous matter and the like, precipitation is very difficult and sometimes is not fully achieved. We have proposed to precipitate materials for many purposes by the application of electrical fields through the bath, and in a further application special direction is made to the development of electrostatic images, the electrostatic charges on an electro-photographic plate causing the precipitation of colouring matter in a liquid to render the image visible to the eye. In physical precipitation by centrifugal means and the like, there is the major disadvantage that with very finely divided materials, or in cases where the suspended matter is of low specific gravity, or where both conditions apply, the precipitation is often not complete and this may be a serious problem in an industrial process or in a chemical analysis.

In electrostatic deposition from a bath it may be desired to produce agglomeration or to increase the yield of deposition for a given applied electrical field. In electro-photography it may be desired to produce a heavier deposit for a given electrostatic image charge. Accordingly it is the object of the present invention to precipitate materials with greater efficiency than heretofore possible and to deposit a greater variety or a greater quantity of material and to arrange precipitation so that effective control is exerted over the amount deposited by controlling the weight, concentration and physical properties of the added precipitator particles.

In general the invention comprises the utilization of a particulate or molecular material consisting of a suspension or solution composed of any selected material which may be of high or low specific gravity, with uncovered particles or particles covered with a control agent which imparts or controls the necessary electrical charge on the particle, so that it will properly physically react with the material to be precipitated while not affecting the chemical or physical structure of the suspending liquid.

The principles underlying the invention are that a bath of particulate or molecular material contained in a semiconducting liquid or an insulating liquid matrix comprises a dispersion of physical electric charges associated with each particle and generated by contact electrification between the particles and the liquid and between particle and particle. The suspension, colloid, or solution is stable because of the repulsion of the like charges on the particles, that is the ionic atmosphere around them. A condition of instability may be produced by introducing particles of opposite polarity and equal or nearly equal magnitude following which precipitation will occur either automatically or when assisted or triggered by a small charge for example on an electro-photographic plate, or by a small triggering charge from a pair of electrodes immersed in the bath or by a small addition of an electrolyte.

This invention thus comprises the method of precipitating particulate or molecular materials which comprise placing the suspension to be precipitated in a bath of electrically insulating liquid, and subjecting the suspension to further particulate or molecular materials carrying electrostatic charges of different polarity.

It will be appreciated that the precipitation depends in the first instance on the interesting phase boundary phenomena which occur when one of the phases in contact is an electrical semi-conductor or an insulator and the other consists of solid particles, colloids, liquid particles or globules, that is emulsions, gas pockets and the like. By contact electrification the particles acquire a charge of single polarity which may be tested by the application of an electrical field within the liquid and observing the pole on which they deposit. Particles of opposite polarity may be introduced to balance the charge on the first particle and these are attracted to it; there remains the net small charge associated with the agglomerated particles which may be readily gravitated or electrically seeded out of suspension. As the magnitude and polarity of the charge on the particles relates to surface properties it is clear that any agent such as a resin or the like may be used to pre-condition or control the charge, further that the extent to which the particles are seeded out of suspension depends on the properties of the particle-resin-oil combination. Further seeding or triggering of suspensions may be assisted by means in which other physical properties of the particles are used such magnetic properties in order to cause additional agglomeration.

It will be appreciated that the materials used for carrying out the invention can of course be widely varied and that the materials used for seeding suspensions can include all particles, resins, oils, waxes, dyes, gums, pigments and the like which can be dispersed in liquids of substantially non-polar character or initially dissolved in liquids of polar character miscible with non-polar liquids.

In order that the invention will be better understood, reference will now be made to certain embodiments of the invention which will be described with reference to the accompanying drawings in which.

Figure 1:
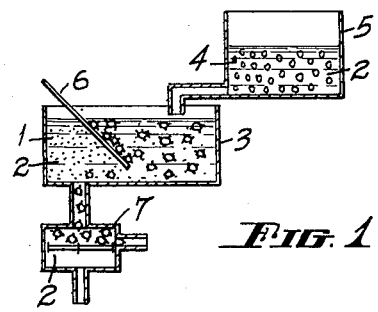
FIG. 1 shows a simple apparatus.

FIG. 1 shows the simplest method of practising the invention in which it is desired to precipitate the particles 1 which are in suspension in the liquid 2 contained in the vessel 3; these particles being of small size for example able to pass through filter paper. Another series of particles 4 which have the opposite polarity when suspended in liquid 2 are introduced in powder form or as a suspension in liquid 2 or in another liquid compatible with liquid 2, from another vessel 5. Assuming that the magnitude of the charge on the particles 4 equals that on particles 1 although of opposite polarity, or alternatively if the sum of the charges on particles 4 introduced is equal, then an iso-electric point is reached at which precipitation occurs or is likely to occur. For the precipitation to be complete the two groups of particles must be mixed in certain proportions within rather narrow limits. The optimum is reached when the proportions are just sufficient to produce uncharged masses, which coalesce and undergo precipitation.

The resultant mixture may be used to develop an electro-photographic plate 6 if there is a small residual charge or the aggregate may be collected in a filter 7.

Control is achieved by means of the balance between the particles.

Figure 2:
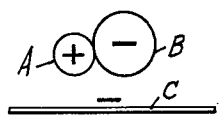
FIG. 2 shows in simple form the principle involved.

FIG. 2 shows how triggered developer may act according to this invention.

Supposing that the particle A has a positive charge of a certain magnitude and the particle B has been attracted thereto because it has a negative charge, now if the charge of the particle B is of a lesser value than that of the particle A, the compound particle will be attracted to the negatively charged area of the electrostatic image on the photo plate C and is held thereon.

Supposing the charge of the plate C has the same value as the charge on the particle A, the charge on the plate C will not now be satisfied by the charge of the compound particle and a second compound particle may be attracted thereto. Even if this is not so, the physical size of the compound particle AB will still be greater than the particle A and a greater number of particles can thus be deposited on a given charged area.

In this way supposing the desired color pigment of the developer has a strongly positive charge and an ineffective number of such particles could therefore be accepted by the electrostatic image, if now such particles had attached to them further particles having a negative charge of lesser magnitude, the resultant effective positive charge will thereby be reduced and when such a compound particle is directed to and accepted by a charged surface during electrostatic developement, it neutralises a lesser amount of the charge of the image and therefore obviously a greater number of such compound particles can be accepted and held by it.

By controlling the relative magnitudes of the two groupings of particles it is possible to control very closely the character of the compound particles and it will be understood that with particles of opposite polarity, as long as the two particles differ in the magnitude of their charge, a compound particle can be formed which will have either polarity depending on the magnitude of the charge of each particle.

Figure 3:
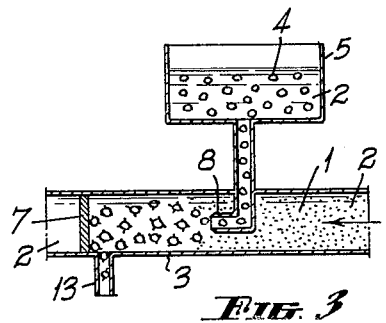

In FIG. 3 is shown the method of practising the invention in which the precipitation is carried out continuously. The particles 1 contained in the liquid 2 are caused to be passed through the cylindrical or tubular member 3 past an area underlying the outlet 8 from the vessel 5 containing the particles 4 in the liquid 2 or some other liquid compatible with liquid 2.

The particles 4 are caused to be injected continuously into the area and to couple up with the particles 1 so causing an agglomeration, following which the agglomerate is removed from the liquid by means of the filter 7.

Figure 4:
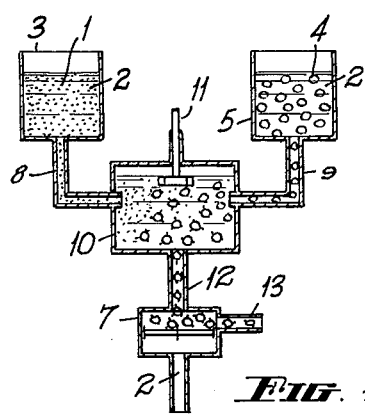
FIGS. 3, 4 and 5 show the process applied in apparatus suitable for continuous operation.

In FIG. 4 there is shown an embodiment of the invention in which the particles 1 and and liquid 2 are contained in the vessel 3 and the particles 4 and liquid 2 are contained in the vessel 5 and the two are mixed in the vessel 10 through the outlets 8 and 9 and by means of the agitator 11, following which they leave through the outlet 12 and are filtered out by the filter or centrifuge 7.

Figure 5:
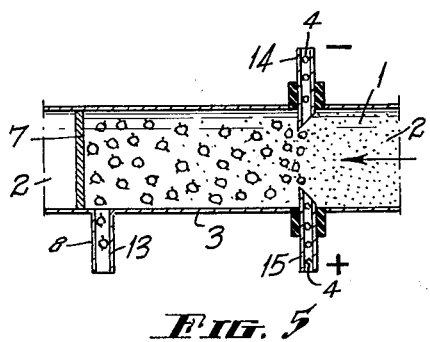

In FIG. 5 is shown an embodiment of the invention in which the particles 1 and the liquid 2 are moving as in FIG. 3 but precipitation is achieved by the injection of charges from electrodes 14 and 15 which may be hollow to be identical with the outlet 8 and also inject particles 4 which are given extra charges by the applied electric field between 14 and 15.

Figure 6:
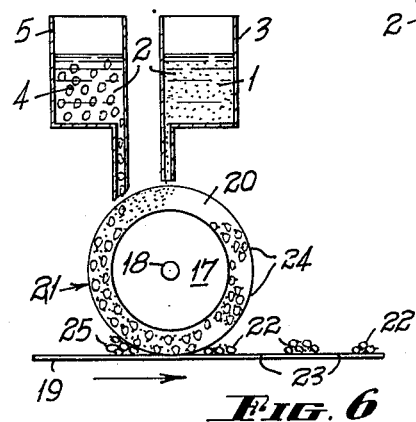
FIG. 6 shows how continuous printing of a web can be effected.

The embodiment shown in FIG. 6 shows a roller 17 which revolves about its axis 18 and is contacted by a web 19 of a photo-conductor paper or the like on which an electrostatic pattern has been formed in the known manner, the absorbent surface 20 of the roller 17 being fed with liquid developer from the two vessels 3 and 5, the vessel 3 containing the liquid 2 with the developer particles 1, the vessel 5 containing the particles 4 of opposite polarity.

The particles 1 and 4 combine at the zone 21 and are transferred to the web at the zones 22 where the electrostatic charge attracts the compound particles.

At the zones 23, which are not receptive of the particles, the particles remain in the absorbent surface of the roller 20 as indicated by the zones 24, being thus carried away from the web at this locality. Surplus developer is pushed along on the web 19 before the roller 17 as indicated at 25.

The following examples of material compositions and the liquids in which they may be dispersed and so agglomerated will serve to illustrate the invention.

EXAMPLE 1

A paint composition of the following proportions dispersed in the liquid carbon tetrachloride:

| | Grams |
|---|---|
| Rhodene L9/50 resin | 100 |
| Zinc oxide | 130 |
| Cobalt naphthenate | 0.5 |
| Manganese naphthenate | 0.5 |
| Toluene | 100 |

The material is milled together in a ball mill for eight hours.

The resin "Rhodene L9/50" is a trademark for a linseed oil modified alkyd resin of the oxidising type having an oil length of 40%, acid value of 25–35, and a specific gravity at 20° C. of 0.98 to 0.99. After mixing the above paste is dispersed in 100 grams of carbon tetrachloride and becomes the basis for the particles 1 and the liquid vehicle 2 which in this case also contains control and fixing agents, as taught in previous applications by the present inventors. To secure agglomeration, or greater yield of particles in electro-photographic processing there is added to the above dispersion, another dispersion of barium sulphate milled with linseed oil, tung oil, hempseed oil or the like and dispersed in tetrachloride.

EXAMPLE 2

A composition of the following proportions for dispersion in the liquid petroleum naphtha designed to give an electro-photographic developer suspension:

| | Grams |
|---|---|
| Pentarol 20 | 15 |
| Rhodene L6/100 | 15 |
| Fusis A | 25 |
| Carbon black | 120 |
| Waxoline nigrosine | 30 |

Pentarol 20 is a trademark for a phenol modified penta-erythritol ester of rosin. Acid value 7–15, specific gravity at 20° C. 1.09, melting range 110–120° C.

The pentarol 20 is digested in Fusis A (heat to 450° F. unitil dissolved) and when solution is complete the Rhodene L6/100 is added. The pigment is then mixed with the resins and blended either in a ball mill or triple roll mill until mixing is complete and pigment particle size is reduced to the desired fineness, such as 0.5 micron. Milling for 8 hours in a ball mill should be found sufficient. The paste so formed is dispersed in a liquid of high volume restivity such as petroleum naptha for example liquids known by the trademarks "Shellite," "Mobilite" and the like. To secure agglomeration or precipitation, or a greater yield in electro-photographic development, there is added to this suspension a dispersion of monolite red pigment prepared in a similar manner, in the proportion 1 is to 20 parts by volume.

EXAMPLE 3

An enamel composition of the following proportions is dispersed in the liquid toluene after compounding:

| | Parts by wt. |
|---|---|
| R.C.I. 5035 toluidine red | 67.0 |
| "P–786–50 Beckosol" | 134.0 |
| Xylol | 101.0 |

Grind in a ball mill and add:

| | Parts by wt. |
|---|---|
| "P–786–50 Beckosol" | 419.0 |
| Xylol | 61.0 |
| 6% cobalt Nuodex | 2.50 |

"Beckosol P–786–50" and "Nuodex" are trademarks for epoxy ester resin and cobalt napthenate respectively. P–786–50 Beckosol is a short oil modified epoxy ester resin, oil length 42%, type of oil dehydrated castor, acid value 1–3, specific gravity 0.950–0.960. "Nuodex" is cobalt-napthenate.

To produce precipitation of the solid content of the enamel there is added petroleum naptha containing talc 50 percent by weight in the proportion 1 part by weight to 10 parts by weight of the enamel composition.

EXAMPLE 4

The addition of beeswax to a mixture of antimony sulphide and calcium fluoride dispersed in carbon tetrachloride results in a clean separation of the two materials, each one precipitating and forming two separate layers on the bottom of the retaining vessel.

EXAMPLE 5

It is known to cause precipitation of materials from solutions by adding to a true solution of the solute another solvent in which the solute is less soluble than it is in the first solvent; the size of the agglomerates is finer according to the slowness with which the second solvent is added. A rapid addition of the second solvent causes the formation of large agglomerates in some cases, depending on the difference in the solubilities of the two solvents. In the present invention this effect can be utilised and added to by the addition of a triggering agent. For example, gum dammar dissolves readily in toluene and when petroleum naptha is added, containing as it does a high proportion of aliphatic hydrocarbons, agglomeration of the gum dammar occurs. Precipitation is increased by the addition of an inorganic powder or electric charges.

As stated earlier, the invention can be applied to the treatment of many materials with a large number of precipitating substances, but some specific applications which will serve to illustrate the invention now follow:

(a) *Removal of Pigments and the Like From Paint*

The invention has application to the removal of pigments and the like from colloidal or near colloidal suspension in paint, for such purposes as the analysis of paint where removal of the materials is difficult even with centrifugal means. The paint is in most cases diluted 10 times by volume for this purpose with a solvent such as carbon tetrachloride or the like. In this invention there is added to the diluted paint a large measured amount of an inert inorganic material such as talc, which in most solvents acquires a negative charge, and the mixture is vigorously agitated until precipitation takes place on standing.

(b) *Accelerated or Triggered Development*

The invention has application to the production of thick deposits and intense colours in development of electro-photographs. As said, in Example 2, by the mixture of two pigments, one comprising a mixture of pigments of both polarities, and the other a single strongly developing pigment, together with their control and fixing agents, there is caused to be deposited on the electro-photographic image a greater yield of particles for a given charge on the plate or paper. For example, it is a matter of difficulty in ordinary printing or in "dry" xerography to secure a strong black, but by means of the present invention there is readily secured a series of intense blacks such as blue black, red black, yellow black, brown black, and the like.

(c) *Removal of Carbon, Sludge and Other Impurities From Dirty Oil*

In a similar way the invention has application to the removal of carbon, sludge and the like from dirty engine oil or solvents for purposes of reclaiming the oil or solvent. To the oil is added a substantial measured quantity of an inorganic powdered salt or other inert powder such as talc, barium sulphate and the like which are found to have a negative charge when dispersed in the oil solvent.

The mixture is continuously agitated for a suitable period to ensure full dispersion of the triggering agent and then allowed to settle or passed through a filter.

(d) *Blending of Powdered Materials and the Like For Dry Developers*

It will be seen that the end product of precipitation from the previous examples will in many cases comprise an intimate mixture of particles having different tribo-electric properties together with a binding agent if desired. Accordingly, this end-product may be used if of appropriate colour and physical character, for "dry" development of electro-photographs, having the advantage of already being blended in the correct tribo-electric proportions.

(e) *Manufacture of Printing Inks*

The end product from a precipitating process such as heretofore described may be arranged to be of suitable composition to be used as printing ink. For example, the components of the ink may be pigment, such as carbon black, lithographic varnish, paraffin wax, lead and manganese napthenates, and the like, which would normally be milled together in a ball mill or the like in a very viscous condition: in this invention the components would be milled in the easily mixed fluid condition with plenty of solvent and then precipitated with a suitable component which may in some cases be one of those already stated such as a wax.

We claim:

1. A method of forming a developer for an electrostatic image which comprises placing pigment particles having a determinable electrostatic charge into an electrically insulating liquid and adding to the liquid further pigment particles having an electrostatic charge of opposite polarity and different magnitude relative to the first said charge, the proportions of said particles in the liquid being such as to enable the formation of particle aggregates of relatively reduced charge so that the number of particles required to satisfy the charge of the electrostatic image is increased beyond the number which would be required of the individual particles.

2. A method as defined in claim 1 comprising forming a solution of the first said particles and adding an alkyd resin to said solution to control the electrical charge of the first said particles.

References Cited in the file of this patent

UNITED STATES PATENTS

| | | |
|---|---|---|
| 1,377,554 | Bloom | May 10, 1921 |
| 1,958,406 | Darrah | May 15, 1934 |

OTHER REFERENCES

Bancroft: Applied Colloid Chemistry, 2nd ed., 1926, McGraw-Hill, New York, pp. 306–317.